Oct. 3, 1961
J. C. DUDDY
3,003,012
ELECTRIC BATTERY
Filed July 10, 1958
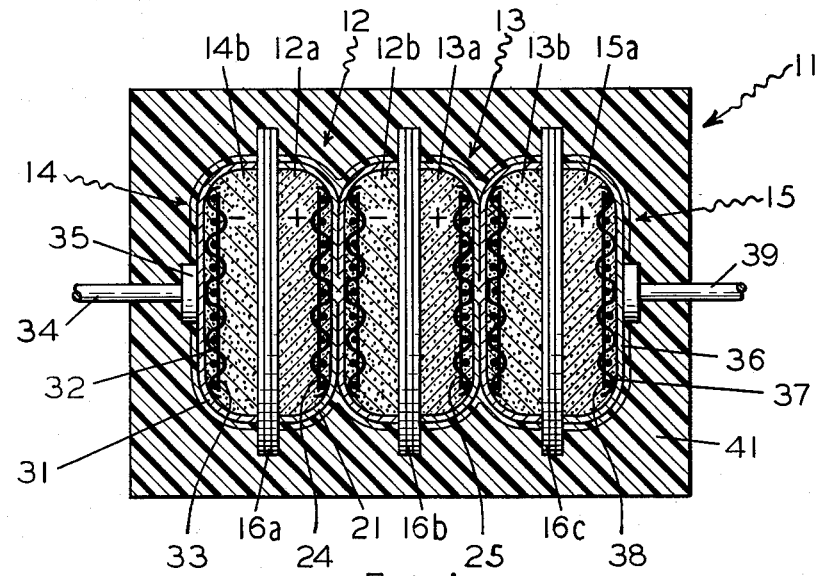
FIG. 1
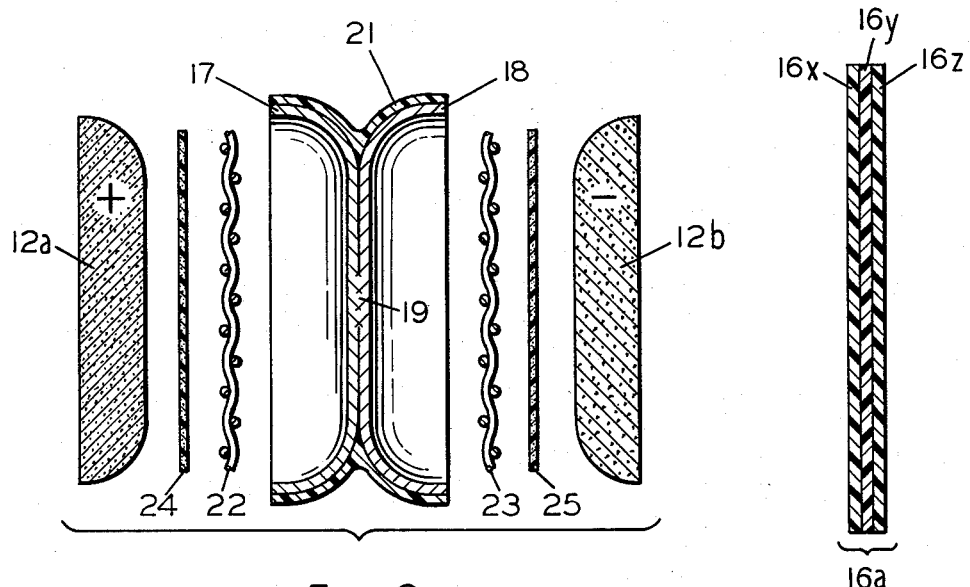
FIG. 2
FIG. 3
INVENTOR.
JOSEPH C. DUDDY
BY
*Edward J. Drayer*
ATTORNEY 3,003,012
ELECTRIC BATTERY
Joseph C. Duddy, Trevose, Pa., assignor to The Electric Storage Battery Company, a corporation of New Jersey
Filed July 10, 1958, Ser. No. 747,621
4 Claims. (Cl. 136—9)

The present invention relates to an improvement in electric batteries. More specifically, the present invention is concerned with a rechargeable battery of the pile type.

An object of the present invention is to provide a rechargeable pile type battery capable of being sealed and which is characterized by an extremely high efficiency in terms of energy available in proportion to the weight of the battery.

Another object of the present invention is to provide a pile type battery incorporating a new and improved bipolar element utilizing an optimum quantity of active material per unit of cell volume and having a minimum possibility of intercell electrolyte leakage.

In accordance with the present invention, there is provided a compact rechargeable battery characterized by a new and improved bipolar element. The battery is shown here to be a silver-zinc alkaline type battery merely for the purposes of illustration. It should be understood that the invention is not limited to any specific type battery but is applicable to the construction of many different type batteries, primary as well as secondary.

The bipolar element employed comprises a positive electrode and a negative electrode in the form of structurized wafers of active material housed in metallic cups. The cups housing the electrodes are joined, as by welding, in a back-to-back relationship to form a conductive but electrolyte impermeable barrier between the two electrodes of opposite polarity. The V-shaped circumferential recesses produced by the rims of the cups in the back-to-back configuration results in a condition of maximum sealing area for a given electrode thickness. To provide a more positive electrical contact between the cups and the structurized electrodes, a metallic grid, such as woven screen or expanded metal, is welded to the bottom of each cup. The structurized electrodes, which are pre-shaped to fit the cups, are then placed into the cups and pressed into the grids. If it is desired to achieve a stronger electrical or physical bond between the electrodes and the cups, a thin compressed film of thermoplastic resin, rendered conductive by having dispersed throughout a high percentage of finely divided metallic particles, may be placed between the grids and the electrodes. The pressing operation described above is then carried out at a temperature which renders the film thermoplastic and adhesive, which characteristics aid in the consolidation of the assembled elements.

The bipolar elements thus constructed may be electrochemically formed prior to assembly into a battery or alternately may be saturated with electrolyte for formation after assembly. For assembly into batteries, the bipolar elements are stacked with a separator between adjacent positive and negative electrodes and with suitable end cells. The entire assembly is then encapsulated in a potting compound to seal and contain the elements.

A better understanding of the present invention may be had from the following description when read with reference to the accompanying drawing of which:

FIG. 1 is a cross sectional view of a battery embodying the present invention;

FIG. 2 is an exploded view of a bipolar element utilized in a battery shown in FIG. 1 showing the components which make up this element; and FIG. 3 is an enlarged sectional view of one of the separators utilized in the battery shown in FIG. 1.

Referring now to FIG. 1, there is shown a battery 11 embodying the present invention which comprises a plurality of bipolar elements 12 and 13 and the end cell elements 14 and 15. The bipolar element 12 has a positive electrode 12a and a negative electrode 12b. Similarly, the bipolar element 13 has a positive electrode 13a and a negative electrode 13b. The end cell element 14 has a negative electrode 14b and the end cell element 15 has a positive electrode 15a. The electrodes 14b and 12a are separated by an electrolyte permeable separator 16a which extends outwardly from the entire periphery of the electrodes 14b and 12a. Similar separators 16b and 16c are provided between the electrodes 12b and 13a and between the electrodes 13b and 15a respectively.

The positive and negative electrodes of each of the bipolar elements are housed in metallic cups which are joined together in a back-to-back relationship. This construction is best shown in FIG. 2 which is an exploded view of the bipolar element 12, including the metallic cups 17 and 18. For a battery of the silver-zinc type, it has been found desirable to press the cups from thin silver discs. The parts so shaped are then etched to provide a clean rough surface. Two such cups in the back-to-back position are spot welded together at 19 and coated peripherally with a suitable sealing compound 21 which may be an epoxy resin such as the Electronic Plastics Corporation's Epoxy #450, containing about 5 percent by weight of their #7 accelerator. Another sealing compound, Plastikon, manufactured by the B. F. Goodrich Co., has also been found to be adapted for this use. It will be noted that the V-shaped circumferential recess produced by the lip radius of the cups in the back-to-back configuration results in the condition of maximum sealing area for a given electrode thickness. In addition, this provides for a maximum path to impede leakage of electrolyte between adjacent cells.

The cups 17 and 18 provide an electrolyte impermeable enclosure surrounding three sides of both the positive and negative electrodes 12a and 12b which are shaped to fit therein. As will be explained in more detail hereinafter, this aids in the prevention of intercell electrolyte leakage. In addition to this function, the cups 17 and 18 provide electrical contact between the positive electrode 12a and the negative electrode 12b of the bipolar element. To this end, the cups 17 and 18 are provided with the metallic grids 22 and 23 respectively, which are shaped to fit into the bottoms of the cups. The grids 22 and 23 may be made of woven screen or of an expanded metal such as silver and are preferably joined to their respective cups as by welding to insure good electrical contact therewith. This operation may be carried out simultaneously with the joining of the cups.

In addition to the grids 22 and 23, conductive thermoplastic films 24 and 25 may be included in the bipolar element 12 between the grids 22 and 23 and the electrodes 12a and 12b. The films 24 and 25 preferably comprise a matrix of polyethylene having finely divided silver particles intimately dispersed therethrough which is subsequently compacted in order to obtain high conductivity. Like the grids 22 and 23, the films 24 and 25 are shaped to fit into the bottom of the cups 17 and 18.

Both the positive electrode 12a and the negative electrode 12b are structurized wafers of electrochemically active material shaped to fit into the cup 18. The positive electrode 12a preferably consists of a spongy, porous mass of coherent finely divided particles of silver. One process for producing such an electrode is described in my copending application, Serial No. 243,933, filed August 28, 1951, now U.S. Patent No. 2,881,237, granted April 7, 1959. As therein disclosed, this process comprises the impregnation of a combustible carbon base material such as filter paper, synthetic resins or cloth with a compound of silver such as silver nitrate. The combustible material is then burned at a temperature well below the melting point of silver to reduce the compound of silver to metallic silver and structurize it into a porous, cohering mass.

The negative electrode 12b, which may be zinc, is also a structurized wafer shaped to fit into the cups of the bipolar element 12. The electrode 12b may be structurized as by sintering a pressed wafer of zinc oxide. It may also comprise finely divided particles of metallic zinc homogeneously dispersed through a binder. For some applications, it may be found desirable to homogeneously disperse mercuric oxide throughout the zinc electrode or to deposit a layer of mercuric oxide on the surfaces of the electrode 12b.

For the assembly of the bipolar element 12, the positive electrode 12a and the conductive film 24 are fitted into the cup 17 and similarly, the negative electrode 12b and the conductive film 25 are inserted into the cup 18. To consolidate the parts thus assembled, the bipolar element is subjected to a light pressure in the range of about 150 pounds per square inch at a temperature of from about 250° F. to about 275° F. At those temperatures, the binder of the films 24 and 25 becomes thermoplastic and adhesive and under the light pressures, unites the elements into a single unitary form. In this respect, it should be noted that the metallic silver in the films 24 and 25 cooperate with the grids 22 and 23 in establishing electrical contact with the electrodes 12a and 12b. However, for active material such as silver and zinc, adequate electrical contact and structural strength can be achieved without the inclusion of the films 24 and 25. Without the films 24 and 25, the bipolar element may be assembled by pressing the wafers of active material into the grids 22 and 23 which are welded to the bottom of the cups 17 and 18.

As shown in FIG. 1, the end cells 14 and 15 are similar in construction to the bipolar element with the exception that each comprises a single cup housing a single electrode. The end cell 14 comprises a metallic cup 31, the grid 32, which is welded to the cup 31, the conductive thermoplastic film 33, and the negative electrode 14b. In addition, an electrical conductor 34 is welded to the back of the cup 31 at 35. The conductor 34 is the negative terminal of the battery. The end cell 15 is similar in construction to the end cell 14 and comprises the cup 36, the grid 37, the conductive film 38, the positive electrode 15b and the positive terminal of the battery 39. The outer surfaces of both of the end cells are coated with a sealing compound in the same manner as the periphery of the bipolar elements.

The separator means 16a, 16b, and 16c may be assemblies which include three elements. By way of example, the separator 16a is illustrated in detail in FIG. 3. The center element 16y comprises a porous carrier impregnated with an ion exchange resin. The porous carrier may be asbestos, polyethylene, polyvinyl chloride, or copolymers of polyvinyl chloride. The ion exchange resin may be produced by impregnating the porous carrier with the monomeric ingredients necessary to form a cross linked polymeric ion exchange resin. For further details as to how to produce this element, reference may be had to my co-pending application, Serial No. 620,504, filed November 5, 1956, now U.S. Patent No. 2,965,697, granted Dec. 20, 1960, entitled "Battery Diaphragm." As explained in this application, the ion exchange resin is distributed homogeneously throughout the porous carrier and the resultant continuous phase thereof results in the element 16y being transparent.

The elements 16x and 16z, on the opposite sides of the element 16y, are resilient, compressible, and highly porous elements, preferably of microporous polyethylene. These elements are preferably made in accordance with the disclosure of my Patent No. 2,676,929. It will be apparent to those skilled in the art, however, that the elements 16x and 16z may be made of some other porous material and that, in addition, the separator means 16a, 16b, and 16c may be of a conventional type.

The manner in which the elements of the battery are encapsulated will now be described in connection with FIG. 1. The end cells 14 and 15, and the bipolar elements 12 and 13 are stacked with the separator means 16a, 16b, and 16c between adjacent positive and negative plates. In this manner, a plurality of electrolytic cells are formed consisting of the alternate positive and negative electrodes of the end cells and bipolar elements. The elements thus assembled are then placed in a mold into which the encapsulating resin is introduced to form the container 41 which completely surrounds and seals the elements of the battery. Encapsulating materials of various kinds can be used for this purpose. By way of illustration and example and not by way of limitation, a polymerizable resin such as an epoxy resin may be used. One example of such a resin is that known as a Bisonite polyamide-epoxy which consists of 5 parts by weight of K—1, a clear casting resin, and one part by weight of K—4, a catalyst, these being designations of the materials available from the Bisonite Company. This resin composition has the characteristic of slight shrinkage upon curing which retains the elements of the battery under compression after sealing.

While polymerizable resins of the epoxy type are available as liquid which makes for ease of encapsulation, it should be understood that other resins inert to the materials and reactions which take place within the battery may be used. For example, polyethylene may be molded around and about the battery assembly to encapsulate it and provide the container 41. Polystyrene, polypropylene, or polyvinyl chloride are equally suited.

The wall thickness of the container 41 formed by the encapsulating resin may be made adequate to resist any tendency for the assembly to change dimensionally during the charging and discharging of the electrodes. In this respect, several features of the battery of the present invention are designed to absorb the dimensional changes of the electrodes which accompany charging and discharging. For example, the outside elements of the separator means are resilient by virtue of their porosity. In addition, the cups of the bipolar elements are springy by virtue of their shape and back-to-back configuration. These features, in combination with the stress applied by the container 41, tend to offset any discontinuity which tends to occur either in the electrode structure or in the electrical contact originally established between the elements as a result of the volumetric changes of the electrodes which accompany charging and discharging. The exact thickness of the container 41 will vary depending on the size of the assembly, its length, and the like. For example, for an assembly such as illustrated in FIG. 1, where the electrodes are approximately 1¾ inches in diameter and one-tenth of an inch in thickness, a wall thickness of about three-eighths of an inch will be adequate.

The electrodes of the bipolar elements and end cells may be electrochemically formed prior to assembly and encapsulation or, preferably, the formation of the electrodes is carried out after the elements have been assembled and encapsulated. If the formation is carried out after encapsulation, the separator means 16a, 16b, and 16c and the battery electrodes are saturated with electrolyte prior to their assembly and encapsulation. Conventional alkaline electrolytes have been found suitable for this purpose as for example, a 30 to 40 percent solution of potassium hydroxide. For charging, the battery terminals 34 and 39 are connected to a suitable source of charging current. Conventional charging rates can be used. During charging, oxygen will tend to be evolved at the positive electrode. Such oxygen as may appear, however, tends to recombine with the silver or silver oxide and thus, minimizes any substantial rise of gas pressure within the sealed battery. Any hydrogen evolved will be diffused through the container 41 since it is impossible to retain hydrogen in containers made from the types of encapsulating resins described hereinbefore.

The construction of the battery of the present invention is designed to provide extremely efficient operation in terms of energy available in proportion to the weight of the battery. In order to achieve this high efficiency, the bipolar elements have been designed to utilize an optimum quantity of active material for the electrodes with a minimum possibility of intercell electrolyte leakage. To this end, the cups of the end cells and bipolar elements provide housings for the electrodes which surround the electrodes on three sides. In a battery assembly, the edges of the cups and the exposed face of each electrode is in intimate contact with one of the separator means which together with the cups, completely immobilizes the active material of the electrodes. In addition to immobilizing the active material of the electrodes, this construction, as indicated hereinbefore, provides a maximum path to impede leakage of electrolyte between adjacent cells. Still further, the construction restricts the physical exchange of electrolyte between the plates of opposite polarity by electroendosmatic action. One of the major aspects of an intercell leak is that the battery can never be returned to a fully charged condition, for to do so would cause the other electrodes to become overcharged before the leaky electrodes reached the charged state. In this respect, the precoating of the periphery of the cups with the specified materials prior to the encapsulation of the battery assembly assures the good adhesion of the encapsulating resin to the bipolar elements and end assemblies since the potting resin adheres to the peripheral coating and not to the silver of the cups.

Having described the present invention, that which is claimed as new is:

1. An electrode assembly for a pile type battery encapsulated in a resin polymerized in situ around said assembly comprising, in combination, a plurality of bipolar elements each of said elements comprising a positive electrode and a negative electrode each housed in a metallic cup, said cups being joined in a back to back relationship, a pair of end cells, one of said end cells comprising a positive electrode housed in a metallic cup and the other of said end cells comprising a negative electrode housed in a metallic cup and separator means saturated with an electrolyte interposed between the peripheral edges of adjacent bipolar elements and end cells whereby a plurality of electrolytic cells consisting of a positive electrode of one bipolar element or end cell and the negative electrode of the next succeeding bipolar element or end cell are provided, said metallic cups surrounding their respective electrodes on three sides, the edges of said cups and the exposed face of each of said electrodes being in intimate contact with one of said separator means, an encapsulating resin completely surrounding said assembly, said separator means and said cups immobilizing the active material of said electrodes and maintaining said electrodes out of contact with said encapsulating resin.

2. An electrode assembly as specified in claim 1 wherein said positive electrode is silver and said negative electrode is zinc.

3. An electrode assembly as specified in claim 1 wherein each of said electrodes has a grid therein, each of said grids being physically and electrically connected to the respective electrode cup.

4. An electrode assembly as specified in claim 1 wherein an electrically conductive film comprising finely divided silver particles dispersed throughout a thermoplastic binder is interposed between each of said electrodes and its respective cup.

References Cited in the file of this patent

UNITED STATES PATENTS

| | | |
|---|---|---|
| 1,348,467 | Adams | Aug. 3, 1920 |
| 2,571,616 | Ruben | Oct. 16, 1951 |
| 2,575,337 | Ellis | Nov. 20, 1951 |
| 2,620,369 | Daniel | Dec. 2, 1952 |
| 2,626,295 | MacFarland | Jan. 20, 1953 |
| 2,684,989 | Wilburn | July 27, 1954 |
| 2,818,462 | Solomon | Dec. 31, 1957 |
| 2,824,165 | Marsal | Feb. 18, 1958 |
| 2,833,848 | Martz | May 6, 1958 |
| 2,851,510 | Pauli | Sept. 9, 1958 |
| 2,853,537 | Corren | Sept. 23, 1958 |
| 2,870,235 | Soltis | Jan. 20, 1959 |